M. C. ROSENFELD.
PIPE HANGER.
APPLICATION FILED JAN. 4, 1913.

1,098,410.

Patented June 2, 1914.

UNITED STATES PATENT OFFICE.

MORTIMER C. ROSENFELD, OF CLEVELAND, OHIO.

PIPE-HANGER.

1,098,410.

Specification of Letters Patent. Patented June 2, 1914.

Application filed January 4, 1913. Serial No. 740,164.

*To all whom it may concern:*

Be it known that I, MORTIMER C. ROSENFELD, a citizen of the United States, residing at Cleveland, in the county of Cuyahoga and State of Ohio, have invented a certain new and useful Improvement in Pipe-Hangers, of which the following is a full, clear, and exact description, reference being had to the accompanying drawings.

This invention relates to pipe hangers of a type especially adapted for supporting vertical pipes from structural iron or steel beams of metallic structures, or from the joists of frame buildings.

The objects of the invention are to provide a hanger which will adapt itself readily to various conditions of installation, which is of simple and substantial construction, which involves comparatively few parts, and which is highly efficient, while capable of very economical production.

The hanger comprises generally a plurality of segmental clamping members secured to the pipe by bolts, which also act to retain in place laterally extending arms, the clamping function of the bolts being entirely independent of and unimpaired by their arm-retaining function.

Figure 1:
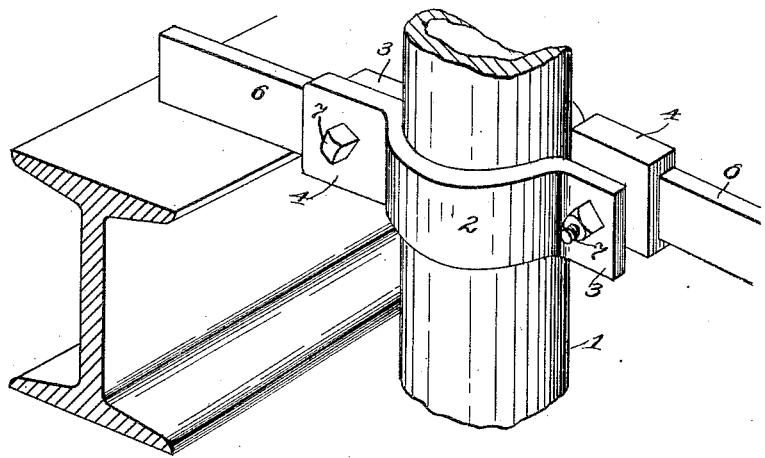
Figure 2:
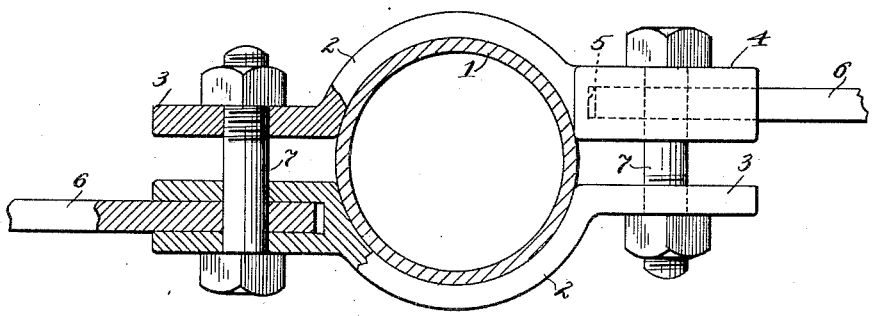
Figure 3:
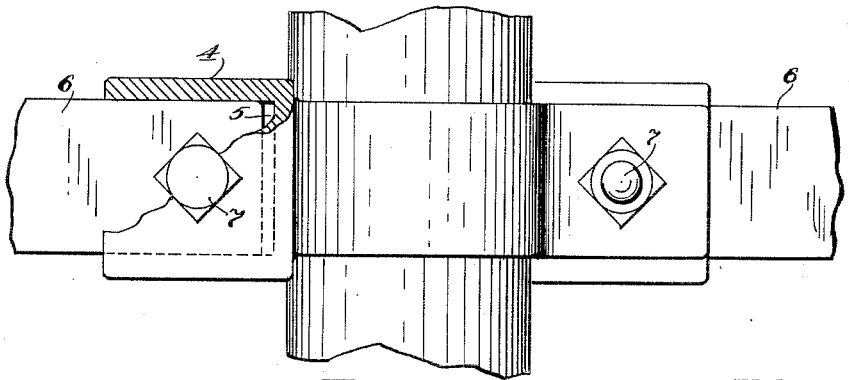

In the accompanying drawing, which forms a part hereof, Figure 1 is a perspective view showing one form of my pipe hanger applied to a pipe, one of the supporting arms being shown as resting upon an I-beam; Fig. 2 is a horizontal cross section through the pipe above the hanger, a part of the hanger being shown in section; and Fig. 3 is an elevation of the hanger applied to a pipe, a portion of one of the clamping members being broken away to show more clearly the manner of attaching the supporting arms.

Taking up a detailed description of the invention by the use of reference characters, 1 represents a pipe to which is secured a plurality of segmental clamping members 2, a pair of such members being shown. Each of said members terminates at one of its ends in a lug 3, which is practically of the same cross sectional area as the curved or segmental portion. The opposite end of each of the members 2 is enlarged to form a head 4. This head is provided with a cavity or socket 5 for the reception of the end of a supporting arm 6. Holes which pass through a lug 3 and the enlarged head 4 of an adjacent clamping member are designed to aline when the clamping members are applied to a pipe. The ends of the supporting arms 6, which occupy the sockets 5, are also provided with holes which may register with the holes passing through the sides of the head 4 when the arms are in position. Bolts 7, which pass through the holes in each head 4, through the hole of the inserted arm 6 and the hole in the lug 3 of the adjacent clamping member clamp the members 2 securely to the pipe and retain the supporting arms in place.

There is a great difference in the conditions under which pipe hangers of the class to which this invention relates are used. For instance, the distance between the beams or joists upon which the outer ends of the supporting arm rest varies greatly in different installations, and the position of the pipe with respect to the member from which it is to be supported may also vary, requiring one of the supporting arms to be longer than the other. Therefore, it is desirable to have a hanger which can be quickly and easily adjusted or changed to meet these various requirements and, in view of this fact, I have employed standard strap steel for the supporting arm. The use of this stock permits a variety of sizes of arms to be carried in hand at a slight expense; moreover, it is but a simple operation to cut such material to the desired length, should it be found necessary to do so. For further convenience, I have made the clamping members interchangeable, which obviates the trouble and annoyance of having to assort the clamping members into pairs of complementary parts.

While, for purposes of illustration, I have shown but two segmental clamping members for the hanger, it will be evident that the hanger may comprise any desired number of segmental clamping members, according to the varying conditions and incidents of use.

Having thus described my invention, what I claim is:—

1. In a device of the character set forth, the combination of a plurality of clamping members each having a lug at one end and a socketed head at its opposite end, supporting arms mounted in the sockets, and means securing together the lug of one member and the head of an adjacent member.

2. In a device of the character set forth, the combination of a plurality of segmental clamping members each having a lug at one end and a socketed head at its opposite end, supporting arms mounted in the sockets, and means extending through the lug of one member and the head of another member and through the inserted arm for the purpose of clamping said members together and securing the arms in place.

3. In a device of the character set forth, the combination of a plurality of clamping members each having at opposite ends thereof an extension, one of said extensions having a socket therein, arms removably fitted within the sockets, and bolts extending through the adjacent extensions of said members and serving to clamp said extensions together and the arms within the sockets.

4. In a device of the character set forth, the combination of a plurality of segmental clamping members each having a socketed extension, means for securing said members together, and arms removably applied to the sockets in said extensions.

5. A clamping device of the character set forth comprising a plurality of segmental clamping members each having a lug at one end and a socketed head at the other end adapted to receive an arm, and bolts extending through the lug of each member and the head of an adjacent member.

In testimony whereof, I hereunto affix my signature in the presence of two witnesses.

MORTIMER C. ROSENFELD.

Witnesses:
J. B. HULL,
BRENNAN B. WEST.

---

Copies of this patent may be obtained for five cents each, by addressing the "Commissioner of Patents, Washington, D. C."